(No Model.)
W. DUNN.
CAR COUPLING.
No. 315,015.  Patented Apr. 7, 1885.
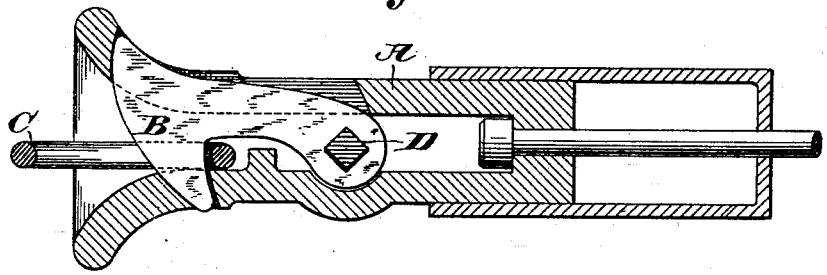
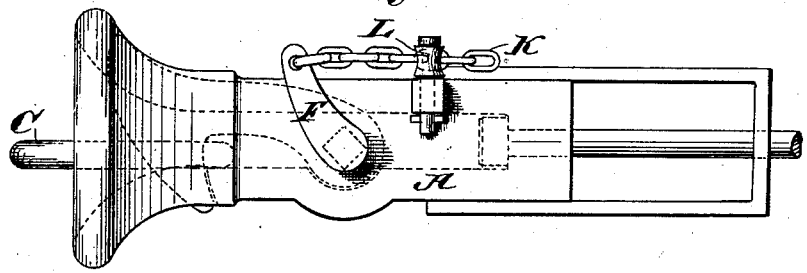
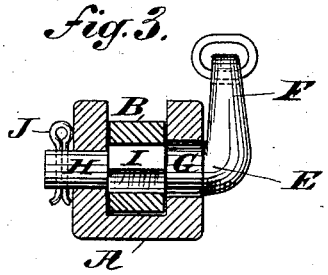
Witnesses:
Henry Eisling,
P. F. Gaylord.
Inventor:
William Dunn,
by Saml. A. Duncan,
atty.

UNITED STATES PATENT OFFICE.

WILLIAM DUNN, OF NEW YORK, N. Y., ASSIGNOR TO CALVIN B. McQUESTEN, OF SAME PLACE.

CAR-COUPLING.

SPECIFICATION forming part of Letters Patent No. 315,015, dated April 7, 1885.

Application filed February 27, 1885. (No model.)

*To all whom it may concern:*

Be it known that I, WILLIAM DUNN, of the city, county, and State of New York, have invented certain new and useful Improvements in Car-Couplers, of which the following is a full, clear, and exact description, that will enable others skilled in the art to which they appertain to make and use the same, reference being had to the accompanying drawings.

This invention relates especially to that class of car-couplers in which the connecting-link is held by a swinging hook which lies in a socket in the draw-head and is pivoted to the draw-head by a pin that is made rigid with the hook, and is provided with a crank-arm, by which the hook can be lifted to release the connecting-link. With this construction much wear of course comes upon the crank-pin which holds and through which the swinging hook is operated, and it is therefore desirable to make such pins so that they, as well as the hooks, when worn out or broken, may be readily removed and substituted by others; and to this end, also, it is requisite that the hook and pin be so constructed that they may be put in place and secured without the necessary use of hand-tools; and, furthermore, they should be of the simplest possible form, so as to be cheaply made.

My invention consists of a hook for engaging the connecting-link, which hook is provided with an angular hole at its pivot end, and lies in a suitable mortise or socket in the draw-head; and it also consists of a crank-pin for holding such hook in place, this crank-pin being flat-sided where it passes through the hook to correspond with the angular opening in the hook, and to be rigid therewith, while its bearings in the draw-head are circular, the one next the crank-arm being larger than the angular part of the pin, and the one at the other end of the pin being smaller than such angular part.

In the drawings, Figure 1 is a central vertical section of a car-coupler embodying my improvements. Fig. 2 is a side view of the same, and Fig. 3 is a vertical cross-section through the crank-pin bearings.

In these views A represents the draw-head. B is the hook that engages with the connecting-link C. D is an angular hole at the pivot end of the hook. E is the pivot-pin which holds the hook in place in the draw-head. F is the crank-arm on the end of such pin. G is the larger circular bearing of the crank-pin in the draw-head. H is the smaller circular bearing of the same. I is the flat-sided or angular part of the pin which passes through the angular hole in the hook. J is a key for holding the pin in place. K is a chain attached to the crank-arm and running to any suitable place or connection, and is for lifting the hook; and L is a chain-pulley for guiding the chain, so that it shall lead from the crank-arm in the proper direction to lift the hook when pulled.

It will be seen that the smaller circular end of the pin, in order to pass through the hook to its bearing in the draw-head, must be of less size than the flat-sided portion that is intended to be in the hook; also, that to permit the flat-sided portion of the pin to enter to the hook, the hole in the draw-head, through which it must pass, should be as large or larger than such square or flat-sided portion. By this arrangement the crank-pin can be made, by its angular portion, to have such a connection with the hook as is necessary to lift the hook, and this, too, without other means of attachment, and yet can be readily removed when, by reason of being worn out or broken, it becomes necessary to substitute another for it. Furthermore, the flat-sided portion of the pin forms a shoulder which bears against the inner face of the draw-head, and the larger circular bearing forms a like shoulder that bears against the hook, thus keeping the parts in proper relation and preventing binding and chucking when slightly worn.

I have shown in the drawings a well-known form of key for holding the pin in place; but of course any other suitable device might be used for this purpose.

The hook may be of any other suitable form that will answer the purpose, and it may be socketed in the draw-head differently, or the draw-head itself may be changed without departing from the features of invention, and therefore I do not confine myself to the precise forms shown.

What is claimed as new is—

1. The combination, in a car-coupler, of a hook for engaging the connecting-link, and a pivot for fastening said hook to the draw-head, which consists of a crank-pin that is flat-sided in the middle to fit into an angular hole in the hook, and has circular bearings in the draw-head, one of which is larger and one smaller than the said flat-sided part, as and for the purpose set forth.

2. In combination, the draw-head A, the hook B, having hole D, and the crank-pin E F, having the circular bearings G H and the flat-sided part I, for the purpose described.

WILLIAM DUNN.

Witnesses:
 JOS. E. DUNHAM,
 W. H. SMITH.